(12) United States Patent
Wu et al.

(10) Patent No.: US 11,140,442 B1
(45) Date of Patent: Oct. 5, 2021

(54) CONTENT DELIVERY TO PLAYBACK SYSTEMS WITH CONNECTED DISPLAY DEVICES

(71) Applicant: Amazon Technologies, Inc., Seattle, WA (US)

(72) Inventors: Yongjun Wu, Bellevue, WA (US); Abhishek Kumar, Redmond, WA (US); Apoorv Bansal, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/453,797

(22) Filed: Jun. 26, 2019

(51) Int. Cl.
*H04N 21/4402* (2011.01)
*H04N 21/858* (2011.01)
*H04N 21/4627* (2011.01)
*H04N 21/658* (2011.01)
*H04N 21/437* (2011.01)
*H04N 21/4363* (2011.01)

(52) U.S. Cl.
CPC ..... *H04N 21/44029* (2013.01); *H04N 21/437* (2013.01); *H04N 21/43635* (2013.01); *H04N 21/4627* (2013.01); *H04N 21/6582* (2013.01); *H04N 21/8586* (2013.01)

(58) Field of Classification Search
CPC ....... H04N 21/44029; H04N 21/43635; H04N 21/437; H04N 21/4627; H04N 21/6582; H04N 21/8586
See application file for complete search history.

(56) References Cited

U.S. PATENT DOCUMENTS

| | | | | |
|---|---|---|---|---|
| 8,526,609 B1* | 9/2013 | Huang | ............... | H04N 21/4305 348/263 |
| 2013/0227106 A1* | 8/2013 | Grinshpun | ....... | H04N 21/25825 709/223 |
| 2013/0230296 A1* | 9/2013 | Yun | ..................... | H04N 21/4367 386/230 |
| 2013/0275561 A1* | 10/2013 | Phillips | ................... | H04L 65/80 709/219 |
| 2014/0211941 A1* | 7/2014 | Oh | ................. | H04N 21/440263 380/201 |
| 2017/0195722 A1* | 7/2017 | Seo | ................ | H04N 21/440263 |
| 2018/0027039 A1* | 1/2018 | Moorthy | ............ | H04N 21/2401 709/219 |
| 2018/0359539 A1* | 12/2018 | Hongal | .............. | H04N 21/4408 |

OTHER PUBLICATIONS

"Ultra HD Forum: Phase A Guidelines," Revision 1.5, Ultra HD Forum, Sep. 14, 2018, 89 pages.

* cited by examiner

*Primary Examiner* — Randy A Flynn
(74) *Attorney, Agent, or Firm* — Weaver Austin Villeneuve & Sampson LLP

(57) ABSTRACT

Methods and apparatus are described for providing content playback options to content playback systems based on the capabilities of the systems. These techniques determine whether the content options should be provided based on the capabilities of a source device in a combined playback system. The version of the High-bandwidth Digital Content Protection (HDCP) protocol used to initialize the connection between the source and sink devices is determined. Based on the version of the HDCP protocol used, an override message may be sent to the content service, in response to which the media player on the source device is directed to an content service endpoint corresponding to particular set of playback options.

21 Claims, 5 Drawing Sheets

CONTENT DELIVERY TO PLAYBACK SYSTEMS WITH CONNECTED DISPLAY DEVICES

BACKGROUND

Whether content is video-on-demand (VOD), live, or video games, content services typically provide multiple versions or streams of the content that represent various combinations of video codecs, image resolution, and frame rate. In some cases, a content service may constrain the streams made available as playback options to a particular client device based on the playback capabilities of the client device. For integrated playback systems, i.e., systems in which a display is an integrated component of the client device, this may involve a straightforward lookup of static information stored for that type of client device.

The situation is more complicated for combined playback systems in which the client device (also referred to as the source device) is connected to a separate display device (also referred to as the sink device). In many of these cases, the source and sink devices have different capabilities relating to supported image resolutions and/or frame rates. In such cases, it can be problematic to base the available playback options on the capabilities of the source device. That is, if the source device is capable of decoding Ultra-High Definition (UHD) High Frame Rate (HFR) video, but the sink device only supports High Definition (HD) Standard Frame Rate (SFR) video, allowing the source device to request UHD HFR content segments could result in a failure to display any content on the sink device. Unfortunately, there is a significant percentage of these cases in which there is little or no information available about the playback capabilities of the sink device.

One way to handle this is to provide or update code on the client device to detect the capabilities of the connected display device, and then base the available playback options on the lesser of the two sets of capabilities for the two devices. However, there is still a significant number of scenarios in which this is not a practicable approach.

DETAILED DESCRIPTION

This disclosure describes techniques for providing content playback options to content playback systems based on the capabilities of the system. More specifically, these techniques determine whether the content playback options should be provided based on the capabilities of a source device in a combined playback system. According to a particular class of implementations, the version of the High-bandwidth Digital Content Protection (HDCP) protocol used to initialize the connection between the source and sink devices of a combined playback system is determined. Based on the version of the HDCP protocol used, an override message may be sent to the content service, in response to which the media player on the source device is directed to a particular set of playback options. An example may be instructive.

Figure 1:
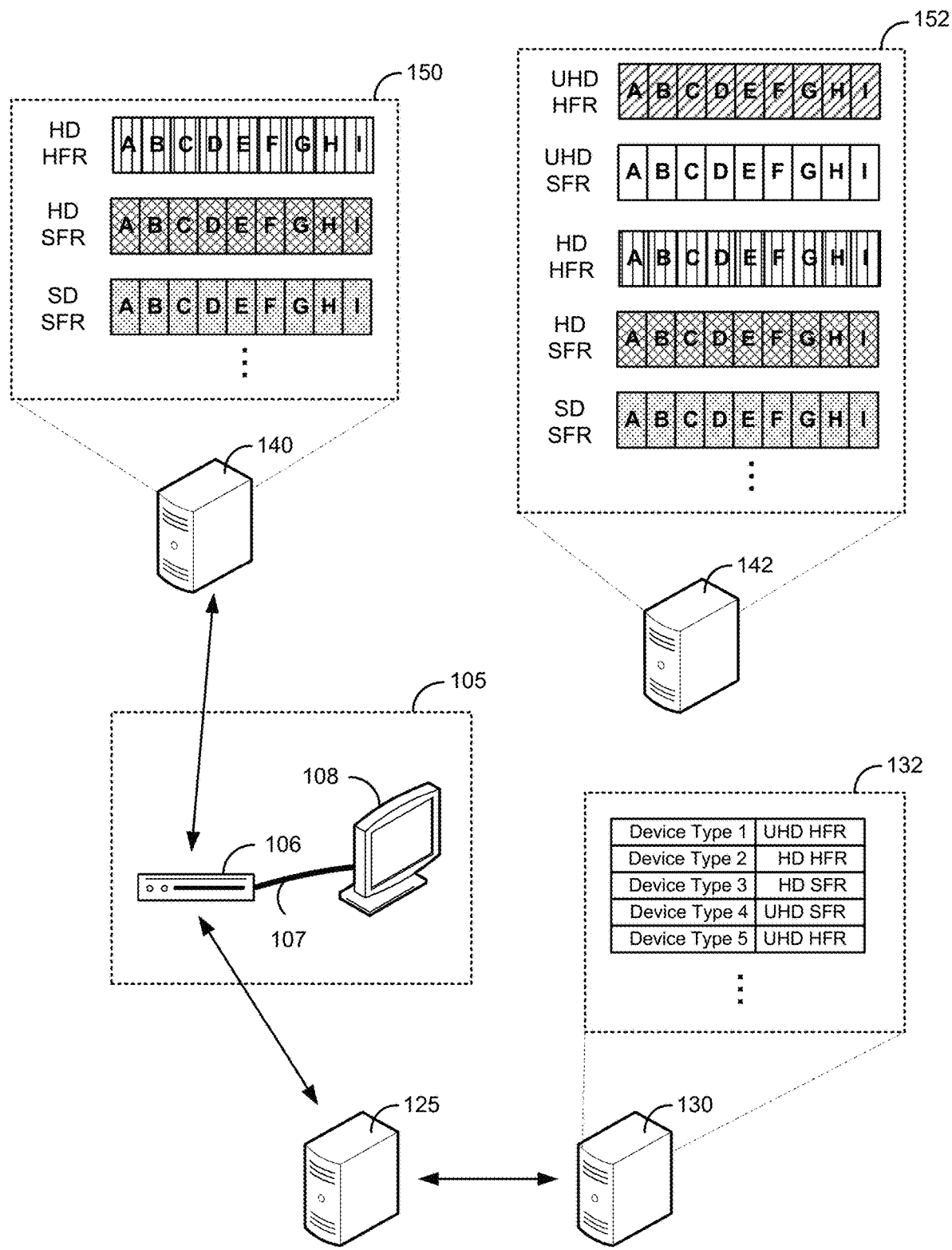
FIG. 1 illustrates an example of an implementation enabled by the present disclosure.

FIG. 1 is a simplified representation of a combined content playback system 105 interacting with a content service (represented by server 125) to initiate playback of a particular content presentation. Playback system 105 includes a client device 106 (e.g., a gaming console or a set top box), a multimedia interface 107 (e.g., a High-Definition Multimedia Interface (HDMI) cable), and a display device 108 (e.g., an LED flat screen television). In the depicted example, client device 106 supports decoding of UHD HFR content, while display device 108 only supports the display of HD HFR content.

Server 125 has access to a playback device capability service (represented by server 130) that stores static information 132 about the playback capabilities for a large number of client devices that have been manually qualified. This information may include, for example, the maximum image resolution supported (e.g., SD, HD, UHD, etc.) and/or the frame rate supported (SFR, HFR, etc.). Server 125 can use this information to determine to which of the available content service endpoints for the requested content presentation (represented by servers 140 and 142) to direct client device 106.

Endpoints 140 and 142 represent different sets of playback options for video segments A-I of the content presentation. Each set of playback options is characterized by a different combination of the maximum image resolution and the maximum frame rate represented in the playback options that are available via that endpoint. In the depicted example, playback options 150 available via endpoint 140 include up to HD HFR segments, while playback options 152 available via endpoint 142 include up to UHD HFR segments. As will be appreciated, the playback options also may include the specific video codec with which the video segments are encoded (e.g., AVC, HEVC, etc.). However, these are not discussed for clarity.

In many cases (e.g., for integrated playback systems), server 125 performs a simple lookup in static information 132 stored by server 130 based on the device type of the client device requesting access to content. The result of the lookup is then used to identify a pointer (e.g., a uniform resource locator or URL) to one of content service endpoints (e.g., 140 or 142) at which the requesting client device can access manifest data that it can then use to request segments of the content. As is well known, manifest data (also referred to herein as playback options or playback options data) enable a client device to generate properly formatted requests for specific segments of a content presentation at different bit rates, resolutions, frame rates, etc.

In the case of combined playback system 105, a simple lookup by server 125 based on the device type of gaming console 106 is not sufficient to ensure reliable playback of the content presentation. That is, because display device 108 to which gaming console 106 is connected does not support the display of UHD HFR video, directing gaming console 106 to endpoint 142 and thereby allowing it to request UHD HFR video segments may result in a failure in the display of the content presentation, e.g., television 108 displaying blank frames.

Instead, and according to a particular class of implementations, code on client device 106 determines whether an override message should be sent to server 125 that would avoid this result. According to a specific implementation, this determination is made with reference to the connection between client device 106 and display 108. When devices 106 and 108 power up, or when HDMI connection 107 is put in place, the connection is initialized by device 106 using the HDCP protocol. Subsequently, when a user selects content for playback (e.g., in a content user interface displayed on display 108), the code on client device 106 detects that the HDMI link was initialized and determines the version of the HDCP protocol used.

The HDCP protocol is a form of digital copy protection in which a transmitting device (e.g., client device 106) determines whether a connected device (e.g., display 108) is authorized to receive and play back protected media content. If authorization is confirmed, the transmitting device encrypts the data for transmission over the connection between the devices (e.g., multimedia connection 107) to prevent eavesdropping during the transmission.

The use of version 2.2 (or later versions) of the HDCP protocol implies a connected display device that is capable of displaying UHD HFR video content. Thus, if the code on client device 106 determines that connection 107 was initialized using version 2.2 or later of the HDCP protocol, no override message is sent to the content service and server 125 identifies the appropriate endpoint with a lookup of the information stored by server 130 based on the capabilities of client device 106.

On the other hand, if connection 107 was initialized using a version of the HDCP protocol earlier than version 2.2, the code on client device 106 may send an override message to server 125. Depending on the implementation, the override message could specify a particular resolution and/or frame rate (e.g., HD HFR) that server 125 uses to identify the appropriate endpoint (e.g., 140). Alternatively, the override message could be simpler (e.g., the setting of a single bit), indicating only that an override of the default selection method should occur. In response to such a message, logic on server 125 might automatically select a default endpoint having a set of playback options that are appropriate for most or all anticipated sink devices (e.g., 140). In this manner, and despite the specific capabilities of client device 106, a suitable set of playback options is provided to playback system 105 that can be played back reliably.

It should be noted that integrated display systems may become combined display systems if, for example, an external display device is connected to the integrated system. In addition, implementations are contemplated in which the connection between the source device and the sink device is some kind of wireless connection over which the content protection protocol handshake occurs. Each of these use cases can be handled in accordance with the techniques enabled by the present disclosure. The scope of the present disclosure should therefore not be limited by reference to the specific details of the examples described herein.

Figure 2:
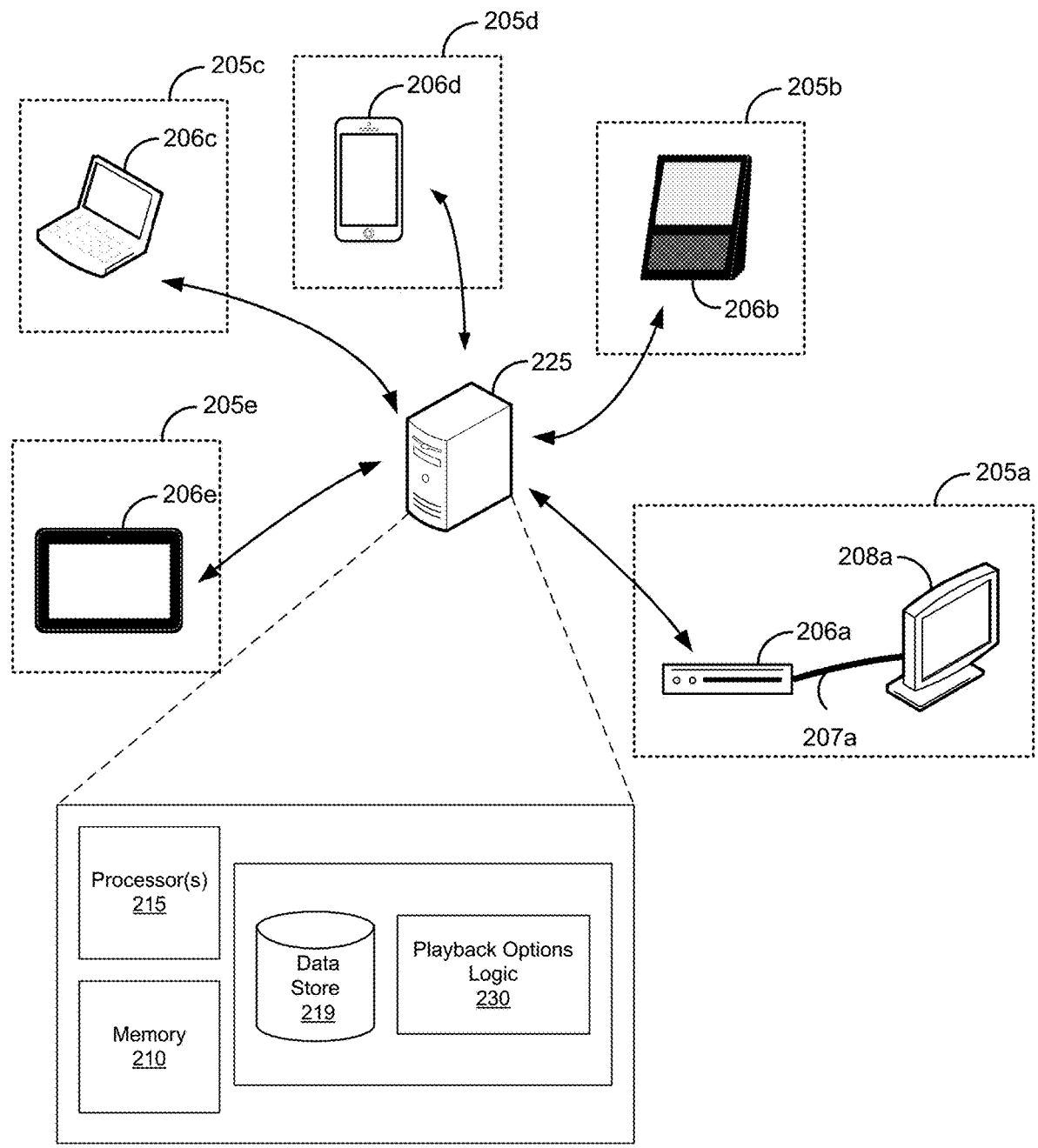
FIG. 2 illustrates an example of a computing environment in which implementations enabled by the present disclosure may be practiced.

FIG. 2 illustrates an example of a computing environment for providing streaming media content according to the techniques enabled by the present disclosure. The computing environment of FIG. 2 includes a media server 225 that provides access to playback options (e.g., in the form of manifest data of playlists) to client devices 206a-e so that these devices can request and receive segments of streaming media content. Client devices 206a-e include smartphones, laptop computers, desktop computers, set-top boxes, video game consoles, tablets, wearable devices, virtual reality headsets, and any of a wide variety of other types of electronic devices. Client devices 206a-e are included in respective content playback systems 205a-e. Some of the content playback systems 205a-e may include additional interconnected components. In FIG. 2, the components of content playback system 205a include client device 206a (e.g., a gaming console or a set top box), multimedia interface 207a, and display 208a. For each content playback system 205b-e, additional components that may be present outside of the respective client devices 206b-e are not illustrated in FIG. 2 for clarity. For the same reason, components internal to the respective client devices 206a-e are not illustrated in FIG. 2.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Although media server 225 is depicted as a single server for clarity, it may be part of a content service and/or delivery system that conforms to any of a wide variety of architectures. The functionality and components of media server 225 can use one or more servers and be deployed in one or more geographic locations (e.g., different countries, regions, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented and/or controlled by one or more of different entities. For example, at least some of the functionality may implemented in an edge server or content server of a CDN, a server of an ISP, etc.

In some implementations, media server 225 includes a service that employs one or more servers to determine and provide playback options (e.g., manifest data or playlists) to client devices 206a-e, which may then request segments from another service using one or more of other servers associated with media server 225 (e.g., an edge server of a CDN based on the playback options data provided. In the depicted example, media server 225 includes one or more processors 215, memory 210, and playback options logic 230 to determine playback options data for requesting clients. As described herein, these playback options may be determined based on a lookup of static playback capability information stored for each type of device (e.g., in data store 219) or, alternatively, the playback options may be determined by playback options logic 230 in response to other information such as, for example, an override message from logic on a client device.

Client devices 206a-e include various types of logic used to implement a content service client application and/or a media player to provide playback of media content. Client devices 206a-e include one or more processors, memory, and client-side logic to implement at least some of the functionalities enabled by the present disclosure such as, for example, detecting initialization of a multimedia link between a source device and a sink device in a combined playback system (e.g., 205a), determining whether an override message should be sent to the content service, requesting content segments based on received playback options data, and implementing bit rate capping, to name a few.

Figure 3:
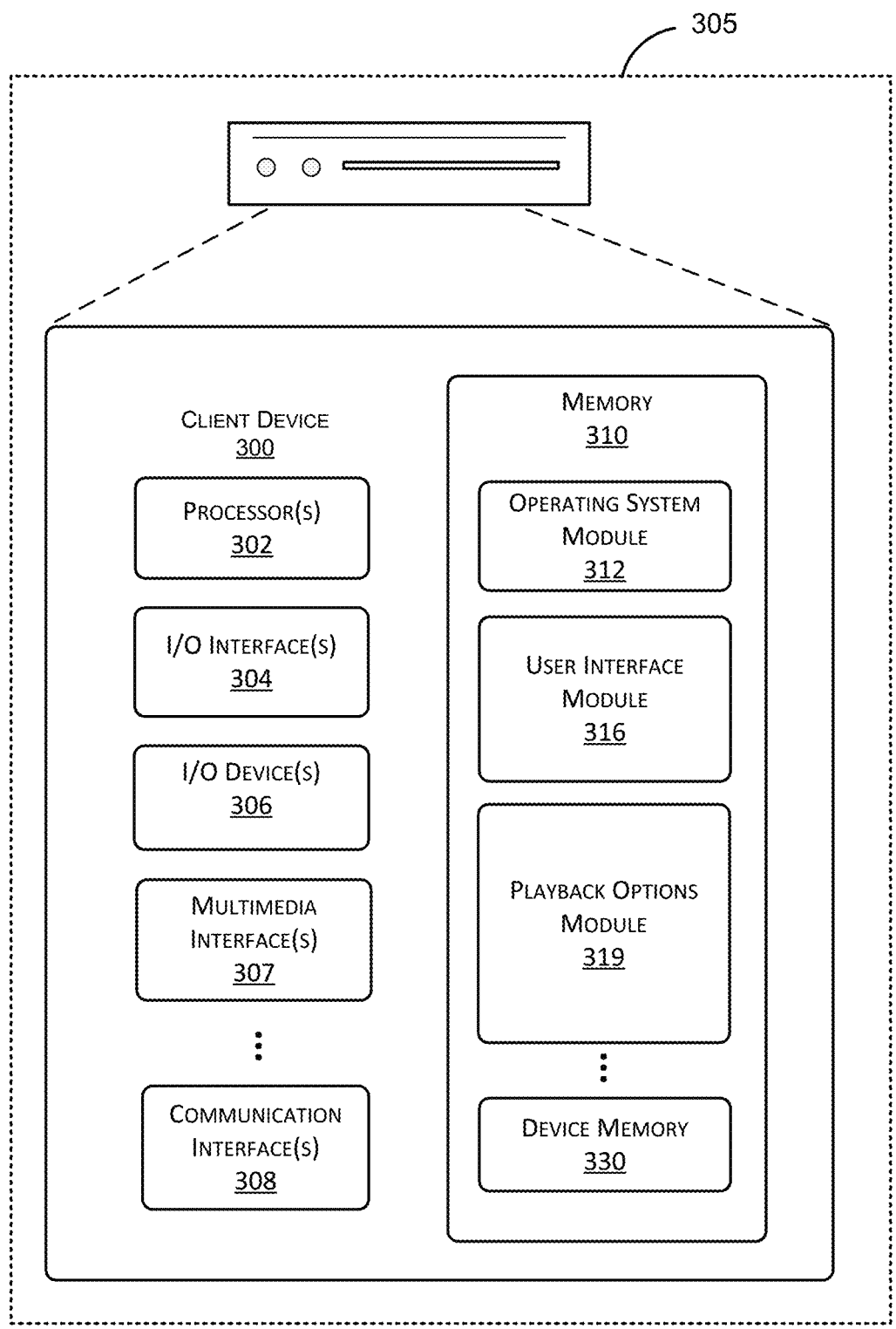
FIG. 3 illustrates an example of a client device with which implementations enabled by the present disclosure may be practiced.

A block diagram of an example of a client device 300 suitable for use with various implementations enabled by the present disclosure is shown in FIG. 3. Client device 300 is included in a content playback system 305. Components outside of client device 300 (e.g., a connected display device) are not illustrated in FIG. 3 for clarity. Client device 300 includes one or more single or multi-core processors 302 configured to execute stored instructions (e.g., in device memory 330). Client device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 may be coupled to one or more I/O devices 306. I/O device(s) 306 may include one or more haptic generators, a touch sensor array, one or more accelerometers, one or more image capture systems, one or more motion sensors, one or more orientation sensors, microphones, speakers, and so forth.

Client device 300 also includes one or more multimedia interfaces 307 that enable connection of client device 300 to other components of playback system 305 such as, for example, an external display device. According to some implementations, interface(s) 307 include a High-Definition Multimedia Interface (HDMI) that may be configured to support connections using the High-bandwidth Digital Content Protection (HDCP) protocol. It should be noted, however, that implementation are contemplated that relate to other types of interfaces (e.g., DVI and VGA).

Client device 300 may also include one or more communication interfaces 308. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a Wi-Fi LAN and a Bluetooth PAN. Client device 300 also includes one or more buses or other internal communications hardware or software (not shown) that allow for the transfer of data and instructions between the various modules of the device.

Client device 300 also includes one or more memories (e.g., memory 310). Memory 310 includes non-transitory computer-readable storage media that may be any of a wide variety of types of volatile and non-volatile storage media. Memory 310 provides storage for computer readable instructions, data structures, program modules and other data for the operation of client device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interface(s) 304, multimedia interface(s) 307, and communications interface(s) 308, and provide various services to applications or modules executing on processor(s) 302. Memory 310 also includes a user interface module 316 and other modules. Memory 310 also includes device memory 330 to store a wide variety of instructions and information using any of a variety of formats including, for example, flat files, databases, linked lists, trees, or other data structures. In some implementations, a portion of device memory 330 may be distributed across one or more other devices including servers, network attached storage devices, and so forth.

At least some of the logic or computer program instructions used to request playback options data for content playback system 305 (represented by playback options module 319) is resident on client device 300. For example, at least some of this functionality may be implemented as part of the code of a media player operating on client device 300. Alternatively, the functionality represented by module 319 may be implemented separately from the device's media player, e.g., as a client application that interacts with a specific content service. Suitable variations and alternatives will be apparent to those of skill in the art. It will also be understood that client device 300 of FIG. 3 is merely an example of a device with which various implementations enabled by the present disclosure may be practiced, and that a wide variety of other devices types may also be used. The scope of this disclosure should therefore not be limited by reference to device-specific details.

Figure 4:
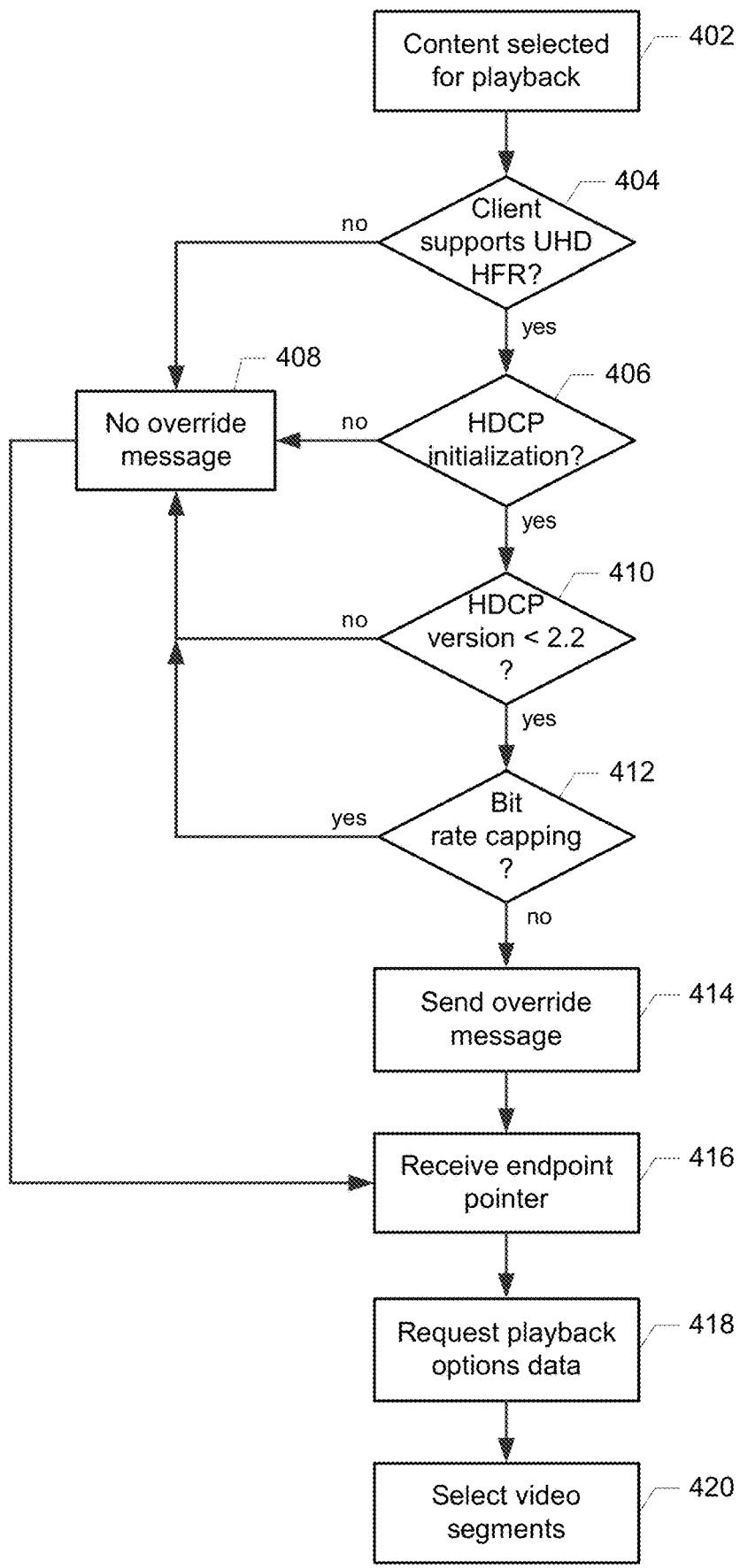
FIG. 4 is a flowchart illustrating operation of an implementation enabled by the present disclosure.

FIG. 4 is a flowchart illustrating operation of client-side logic according to a specific implementation enabled by the present disclosure. It should be noted that the depicted implementation may be employed with any of a variety of content types, e.g., live, broadcast, video-on-demand, just-after-broadcast, game, virtual reality, etc. It should also be noted that the depicted implementation may be employed with any of a variety of video codecs including, for example, H.264 (AVC) and H.265 (HEVC). As will be understood, the selection of playback options as described herein may also be dependent on the codec used to encode the video segments of the content presentation. However, the codecs are not mentioned in the following description for clarity.

The depicted implementation also assumes that the client device (which would be the source device in a combined playback system) is not configured to determine the playback capabilities of a connected display device directly. In such cases, an override message can be sent to the content service if the capabilities of the sink device are determined to be less than those of the source device.

Referring now to FIG. 4, in response to selection by the client device of content for playback (402), e.g., in a content service user interface, and if the client device supports decoding of UHD HFR content (404), it is determined whether a multimedia connection (e.g., an HDMI connection) was initialized using the HDCP protocol (406). If not, the system is assumed to be an integrated playback system and no override message is sent (408), e.g., the content service endpoint may be selected by the content service based on static playback capability information stored by the content service for the client device.

Whether or not the client device supports decoding of UHD HFR content may be relevant in that, if the client device does not have that capability, it may be safe to assume that all or most types of connected display devices will be able to display any content the client device is capable of decoding, and that therefore the content service endpoint may be selected based on the static playback capability information for that device. However, it should be noted that implementations are contemplated in which this determination is not explicitly performed, and it is assumed that the client device supports the decoding of UHD HFR content, e.g., implementations in which a client device is configured to operate in the manner described only if it has this capability.

If a connection was initialized using the HDCP protocol (406) (thus indicating that the playback system is a combined playback system), and the version of the HDCP protocol used is greater than or equal to version 2.2 (410), no override message is sent (408), e.g., the content service endpoint may be selected based on the static playback capability information for the client device. This is due to the fact that the use of version 2.2 or higher of the HDCP protocol implies that the connected display device is also capable of displaying UHD HFR video content.

If, on the other hand, the version of the HDCP protocol used to initialize the multimedia connection is less than (i.e., earlier than) version 2.2 (410), it is determined whether the client device is configured to implement bit rate capping (412). If so, no override message is sent (408). In such cases, the content service endpoint may be selected based on the static playback capability information for the client device, and the bit rate capping capability of the client device may be relied on to prevent selection of video segments by the client device that can't be displayed by the connected display device. For example, the endpoint to which the client device is directed might provide manifest data or a playlist including UHD HFR video segments as playback options, but these would not be selected by the client device because the client device is configured to impose an appropriate bit rate cap in response to the determination at 410.

On the other hand, if the client device is not configured to implement bit rate capping (412), an override message is sent to the content service (414). As mentioned above, the multimedia connection may be either a wired or a wireless connection.

According to some implementations, the override message specifies or requests a maximum supported image resolution and/or a maximum supported frame rate. Logic at the content service may then use this information to determine the appropriate endpoint to which the client device should be directed. Alternatively, the override message may simply indicate (e.g., with a generic message or even a single bit) that the default mode of selecting the endpoint (e.g., using the static playback capability information) should be overridden. In response to this, logic at the content service might then select an override default endpoint.

Whether or not an override message is sent, and regardless of how the endpoint is selected by the content service, a pointer (e.g., a URL) corresponding to the selected endpoint is received from the content service by the client device (416). The client device uses that pointer to request playback options data (e.g., manifest data or a playlist) from the corresponding endpoint (418). The client device then uses the playback options data to select video segments for playback using, for example, any of a wide variety of bit rate selection algorithms (420).

Figure 5:
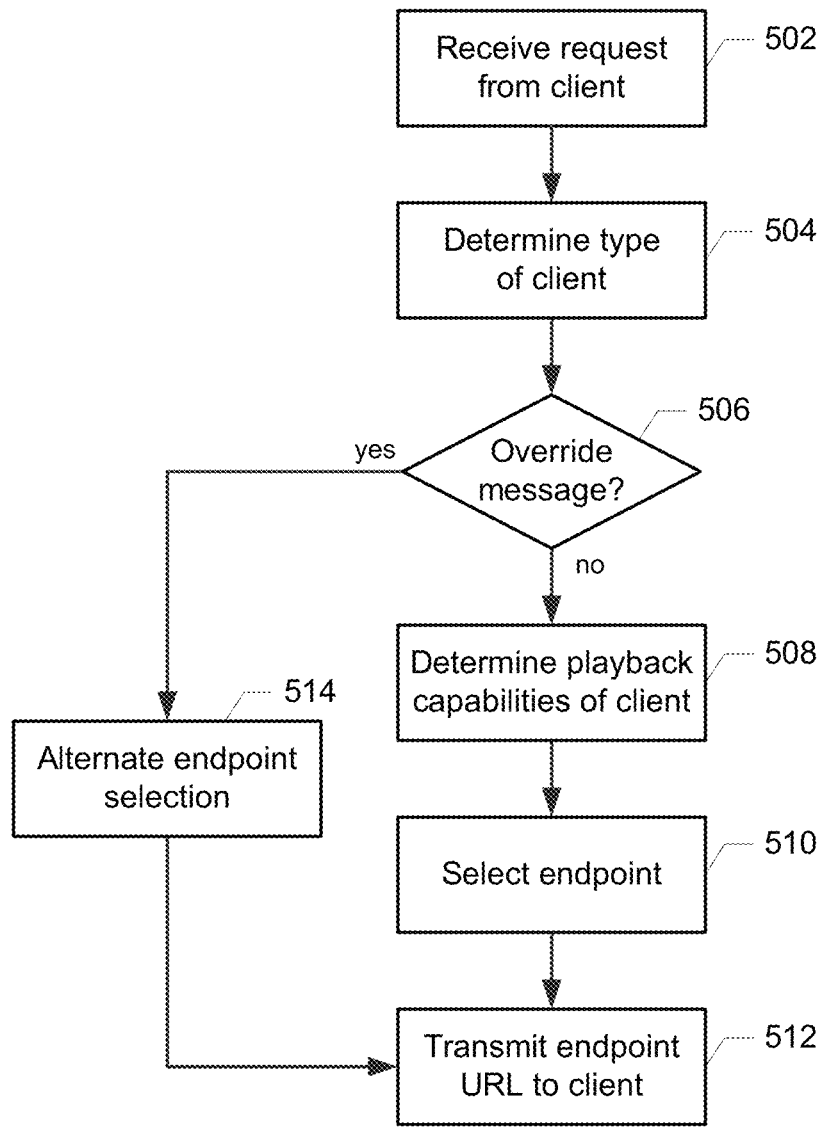
FIG. 5 is another flowchart illustrating operation of an implementation enabled by the present disclosure.

FIG. 5 is a flowchart illustrating operation of server-side logic according to a specific implementation enabled by the present disclosure. Upon receiving a request to initiate playback or download of a content presentation from a client device (502), a content service determines the type of the client device (504). If there is no override message associated with the request (506), the content service determines the playback capabilities of the client device (508). As discussed above, this may be done by using the client device type to perform a lookup in static playback capability information stored by an associated database or service. Based on the playback capabilities of the client device, the content service selects an appropriate one of the endpoints associated with the content presentation (510) and transmits a pointer (e.g., a URL) corresponding to the endpoint to the client device (512).

If, on the other hand, an override message is associated with the request (506), the content service employs a different approach in selecting an appropriate endpoint for the client device (514). As discussed above, this selection might be informed by a particular image resolution and/or frame rate specified by the override message. Alternatively, a default endpoint might be selected in response to the override message. A pointer for the selected endpoint is then transmitted to the client device (512).

While the subject matter of this application has been particularly shown and described with reference to specific implementations thereof, it will be understood by those skilled in the art that changes in the form and details of the disclosed implementations may be made without departing from the spirit or scope of the invention. For example, implementations are described herein in which specific playback capabilities (e.g., UHD HFR) are associated with a particular version(s) of the HDCP protocol (e.g., version 2.2 or above). However, the scope of this disclosure is not limited to this particular use case. That is, implementations are contemplated in which limitations on the playback capabilities of a sink device in a combined playback system may be inferred from other information associated with the connection between the sink device and the source device. For example, use of versions of the HDCP protocol later than version 2.2 might imply that the connected display is capable of displaying image resolutions and/or frame rates that are higher than UHD and HFR.

In another example, use of a particular version of the HDCP protocol might mean that only a certain percentage of connected devices have a certain playback capability. However, the percentage may be such, or the excluded devices sufficiently outdated, that a decision to base the endpoint selection on the capabilities of the source device is warranted. Alternatively, if the reported HDCP version represents a likelihood that a significant number of possible sink devices have playback capabilities that are less than the source device, an override message might be sent regardless of the playback capabilities of the sink device.

More generally, the present disclosure enables implementations in which, depending (at least in part) on the version of the digital content protection protocol used to initialize a multimedia connection in a combined playback system, a decision is made as to whether to override selection of a content presentation endpoint (and its associated playback options) based on the capabilities of the source device of the playback system.

Examples of some of the implementations enabled by the present disclosure are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable storage media having computer program instructions stored therein, the computer program instructions being configured such that, when executed by one or more computing devices, the computer program instructions cause the one or more computing devices to:
- select video content for playback by a client device;
- determine that the client device is capable of decoding Ultra-High Definition (UHD) High Frame Rate (HFR) video content;
- determine that the client device initialized a High-Definition Multimedia Interface (HDMI) connection using a version of the High-bandwidth Digital Content Protection (HDCP) protocol;
- determine that the version of the HDCP protocol is less than version 2.2;
- transmit an override message to a content service based on the version of the HDCP protocol being less than version 2.2;
- receive a first uniform resource locator (URL) corresponding to the first video content from the content service, selection of the first URL being based on the override message;
- request a first manifest for the video content using the first URL, the first manifest not including references to UHD HFR video segments; and
- request segments of the video content using the first manifest.

2. The computer program product of claim 1, wherein the computer program instructions are further configured such that, when executed by one or more computing devices, the computer program instructions cause the one or more computing devices to:
- determine that the client device is configured to implement bit rate capping;
- receive a second uniform resource locator (URL) corresponding to the video content from the content service;
- request a second manifest for the video content using the second URL, the second manifest including references to UHD HFR video segments; and
- transmit a plurality of requests for segments of the video content using the second manifest, none of the requests corresponding to the UHD HFR video segments referenced in the second manifest.

3. The computer program product of claim 1, wherein the override message specifies one of UHD Standard Frame Rate (SFR), High Definition (HD) SFR, or HD HFR.

4. The computer program product of claim 1, wherein the client device does not include an integrated display device, and wherein the HDMI connection is between the client device and a separate display device.

5. A device, comprising one or more processors and memory, the device being configured to decode video content having up to and including a first image resolution and a first frame rate, the one or more processors and memory being configured to:
- determine a version of a digital content protection protocol that has been used to initialize a connection between the device and a separate display, the separate display being characterized by a display capability that does not include the first image resolution and the first frame rate;
- transmit an override message to a content service based on the version of the digital content protection protocol and without determining the display capability of the separate display, the content service being remote from the device;
- receive a first uniform resource locator (URL) from the content service, selection of the first URL being responsive to the override message;
- request a first manifest using the first URL, the first manifest including a first set of playback options for the video content, the first set of playback options not including references to video segments characterized by the first image resolution and the first frame rate; and
- request segments of the video content using the first manifest.

6. The device of claim 5, wherein the connection is a High-Definition Multimedia Interface (HDMI) connection, the content protection protocol is the High-bandwidth Digital Content Protection (HDCP) protocol, and the version of the digital content protection protocol is less than version 2.2 of the HDCP protocol.

7. The device of claim 5, wherein the one or more processors and memory are further configured to:
- determine that the device is configured to implement bit rate capping;
- receive a second URL from the content service;
- request a second manifest using the second URL, the second manifest representing a second set of playback options for the video content, the second set of playback options including references to video segments characterized by the first image resolution and the first frame rate; and
- request segments of the video content using the second manifest without using the references to the video segments characterized by the first image resolution and the first frame rate.

8. The device of claim 7, wherein selection of the second URL is responsive to the device being configured to decode video content having the first image resolution and the first frame rate.

9. The device of claim 5, wherein the first image resolution corresponds to Ultra-High Definition (UHD), the first frame rate corresponds to High Frame Rate (HFR), and the first set of playback options includes references to one or more of UHD Standard Frame Rate (SFR) video segments, High Definition (HD) SFR video segments, or HD HFR video segments.

10. The device of claim 5, wherein the override message indicates at least one of: a second image resolution or a second frame rate.

11. The device of claim 5, wherein the device does not include an integrated display.

12. The device of claim 5, wherein the device includes an integrated display.

13. The device of claim 5, the override message indicating an override of a default selection method that is based on capabilities of the device.

14. A computer program product for use with a device configured to decode video content having up to and including a first image resolution and a first frame rate, the computer program product comprising one or more non-transitory computer-readable storage media having computer program instructions stored therein, the computer program instructions being configured such that, when executed by one or more computing devices, the computer program instructions cause the one or more computing devices to:
- determine a version of a digital content protection protocol that has been used to initialize a connection between the device and a separate display, the separate display being characterized by a display capability that does not include the first image resolution and the first frame rate;

transmit an override message to a content service based on the version of the digital content protection protocol and without determining the display capability of the separate display, the content service being remote from the device;

receive a first uniform resource locator (URL) from the content service, selection of the first URL being responsive to the override message;

request a first manifest using the first URL, the first manifest including a first set of playback options for the video content, the first set of playback options not including references to video segments characterized by the first image resolution and the first frame rate; and request segments of the video content using the first manifest.

15. The computer program product of claim 14, wherein the connection is a High-Definition Multimedia Interface (HDMI) connection, the content protection protocol is the High-bandwidth Digital Content Protection (HDCP) protocol, and the version of the digital content protection protocol is less than version 2.2 of the HDCP protocol.

16. The computer program product of claim 14, wherein the computer program instructions are further configured such that, when executed by one or more computing devices, the computer program instructions cause the one or more computing devices to:

determine that the device is configured to implement bit rate capping;

receive a second URL from the content service;

request a second manifest using the second URL, the second manifest representing a second set of playback options for the video content, the second set of playback options including references to video segments characterized by the first image resolution and the first frame rate; and request segments of the video content using the second manifest without using the references to the video segments characterized by the first image resolution and the first frame rate.

17. The computer program product of claim 16, wherein selection of the second URL is responsive to the device being configured to decode video content having the first image resolution and the first frame rate.

18. The computer program product of claim 14, wherein the first image resolution corresponds to Ultra-High Definition (UHD), the first frame rate corresponds to High Frame Rate (HFR), and the first set of playback options includes references to one or more of UHD Standard Frame Rate (SFR) video segments, High Definition (HD) SFR video segments, or HD HFR video segments.

19. The computer program product of claim 14, wherein the override message to the content service indicates at least one of: a second image resolution or a second frame rate.

20. The computer program product of claim 14, wherein the device does not include an integrated display.

21. The computer program product of claim 14, wherein the device includes an integrated display.

* * * * *